(12) United States Patent
Seghi

(10) Patent No.: US 6,494,233 B2
(45) Date of Patent: Dec. 17, 2002

(54) INSERT WITH CONNECTING OUTLET, PARTICULARLY FOR FLEXIBLE HOSES FOR HYDRAULIC AND INDUSTRIAL APPLICATIONS

(75) Inventor: Paolo Seghi, Ascoli Piceno (IT)

(73) Assignee: Manuli Rubber Industries S.p.A., Ascoli Piceno (IT)

( * ) Notice: Subject to any disclaimer, the term of this patent is extended or adjusted under 35 U.S.C. 154(b) by 0 days.

(21) Appl. No.: 09/781,945

(22) Filed: Feb. 14, 2001

(65) Prior Publication Data

US 2001/0015232 A1 Aug. 23, 2001

(30) Foreign Application Priority Data

Feb. 18, 2000 (IT) .......................................... MI2A00296

(51) Int. Cl.[7] .................................................. F16L 9/00
(52) U.S. Cl. ........................ 138/109; 138/178; 138/155; 285/256; 285/31
(58) Field of Search ................................. 138/109, 155, 138/120, 178; 285/256, 258, 259, 31, 32

(56) References Cited

U.S. PATENT DOCUMENTS

| | | | | |
|---|---|---|---|---|
| 2,430,921 A | * | 11/1947 | Edelmann | 138/109 |
| 2,864,378 A | * | 12/1958 | Schneller et al. | 138/109 |
| 4,106,526 A | * | 8/1978 | Szentmihaly | 138/109 |
| 4,159,027 A | * | 6/1979 | Caillet | 138/109 |
| 4,675,780 A | * | 6/1987 | Barnes et al. | 138/103 |
| 4,850,620 A | * | 7/1989 | Puls | 138/109 |
| 5,782,270 A | * | 7/1998 | Goett et al. | 138/109 |
| 5,931,200 A | * | 8/1999 | Mulvey et al. | 138/109 |
| 6,044,868 A | * | 4/2000 | Gretz et al. | 138/109 |
| 6,260,584 B1 | * | 7/2001 | Foti | 138/109 |

\* cited by examiner

*Primary Examiner*—Patrick Brinson
(74) *Attorney, Agent, or Firm*—Guido Modiano; Albert Josif; Daniel J. O'Byrne

(57) ABSTRACT

An insert with connecting outlet for flexible hoses, particularly for hydraulic and industrial applications, comprising a body which is suitable to be inserted, with a first end, in a flexible hose to be connected and, with a second end, in a port of an apparatus, by locking through a rotatable male element; the end of the body of the insert that is suitable to be inserted in the apparatus port being provided with a retention element which is suitable to lock in its seat the rotatable male element when the insert is inserted, with its second end, in the rotatable male element, the rotatable male element being externally threaded for engagement with the port of the apparatus.

12 Claims, 1 Drawing Sheet

INSERT WITH CONNECTING OUTLET, PARTICULARLY FOR FLEXIBLE HOSES FOR HYDRAULIC AND INDUSTRIAL APPLICATIONS

BACKGROUND OF THE INVENTION

The present invention relates to an insert with connecting outlet, particularly for flexible hoses for hydraulic and industrial applications.

More particularly, the invention relates to an insert with connecting outlet for flexible hoses for the quick connection of the hose to a fixed part.

It is known that substantially three different types of solution are currently used to connect a flexible hose to a fixed part of a machine.

A first solution provides for an insert to be inserted at the end of a flexible hose to be connected to a fixed part of a machine, which has an outlet of the female type; the fixed part of the machine also has an outlet of the female type. An adapter with two male-type threads is screwed into the fixed part of the machine at one end and into the female-type outlet of the insert inserted in the flexible hose at the other end.

This solution therefore entails the need to perform a double screwing action for assembly, on the part which is fixed to the machine and at the end of the hose, and said screwing action must be performed with a controlled torque. This clearly entails a complicated assembly process.

A second solution provides for an insert to be inserted at the end of the hose to be connected to the fixed portion of the machine, on which a threaded rotatable male element is fitted; said male element must be screwed into a female outlet provided on the fixed part of the machine to which the flexible hose is to be connected.

In this case, the presence of the rotatable threaded male element allows a single screwing action, namely the screwing of the rotatable male element into the female outlet of the fixed part of the machine to which the flexible hose is to be connected. However, despite the fact that a single screwing action is necessary, said action is more awkward than in the preceding case.

Finally, the third solution allows quick coupling between a female outlet, provided at the insert of the flexible hose, and an end (;f a male element which has, at its opposite end, a thread for coupling to a female outlet of the fixed part of the machine to which the flexible hose is to be connected.

This last solution allows quick male/female coupling by simply pushing the connector axially with respect to the insert of the flexible hose and allows equally rapid disassembly. However, it has the drawback of a high production cost.

SUMMARY OF THE INVENTION

The aim of the present invention is to provide an insert with connecting outlet, particularly for flexible hoses for hydraulic and industrial applications, which allows quick connection, and disassembly of the conventional type.

Within this aim, an object of the present invention is to provide an insert with connecting outlet, particularly for flexible hoses, which allows to preassemble "off-line" the rotatable male element onto the threaded port, and then insert the hose with the insert directly "on-line" in order to reduce is assembly times.

Another object of the present invention is to provide an insert with connecting outlet, for flexible hoses, which allows direct screwing into the threaded port (female) of the rotatable male element that is preassembled on the insert, in order to avoid the use of the male-male adaptor that is commonly used.

Another object of the present invention is to provide an insert with connecting outlet in which all the elastic elements that provide a hydraulic seal (O-rings) can be accessed for inspection and optionally replaced.

Another object of the present invention is to provide an insert with connecting outlet for flexible hoses which is highly reliable, relatively simple to manufacture and at competitive costs.

This aim and these and other objects which will become better apparent hereinafter are achieved by an insert with connecting outlet for flexible hoses, particularly for hydraulic and industrial applications, comprising a body of the insert which is suitable to be inserted, with a first end, in a flexible hose to be connected and, with a second end, in a port of an apparatus, and locked through a rotatable male element, characterized in that the end of said body of the insert that is suitable to be inserted in said port is provided with a retention element which is suitable to lock in its seat said rotatable male element when said insert is inserted, with its said second end, in said rotatable male element, said rotatable male element being externally threaded for engagement with said port of said apparatus.

BRIEF DESCRIPTION OF THE DRAWINGS

Further characteristics and advantages of the invention will become better apparent from the description of a preferred but not exclusive embodiment of the insert according to the invention, illustrated only by way of non-limitative example in the accompanying drawings, wherein.

DESCRIPTION OF THE PREFERRED EMBODIMENTS

Figure 1:
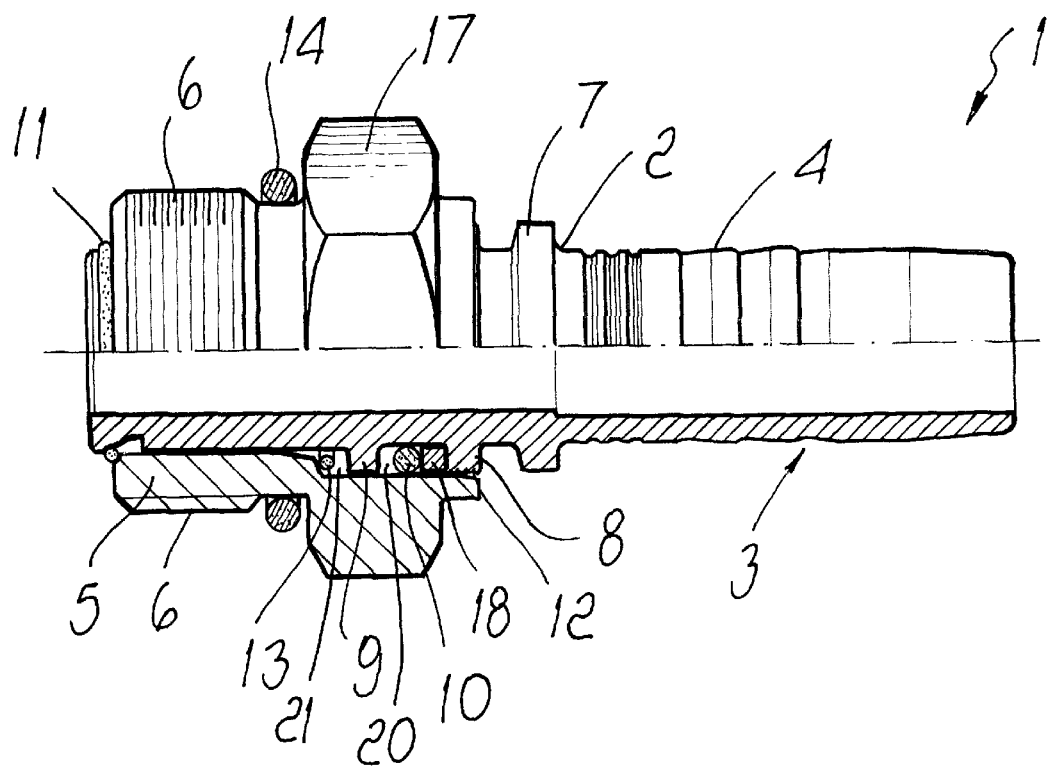
FIG. 1 is a sectional view, taken along a longitudinal plane, of an insert according to the present invention.
Figure 2:
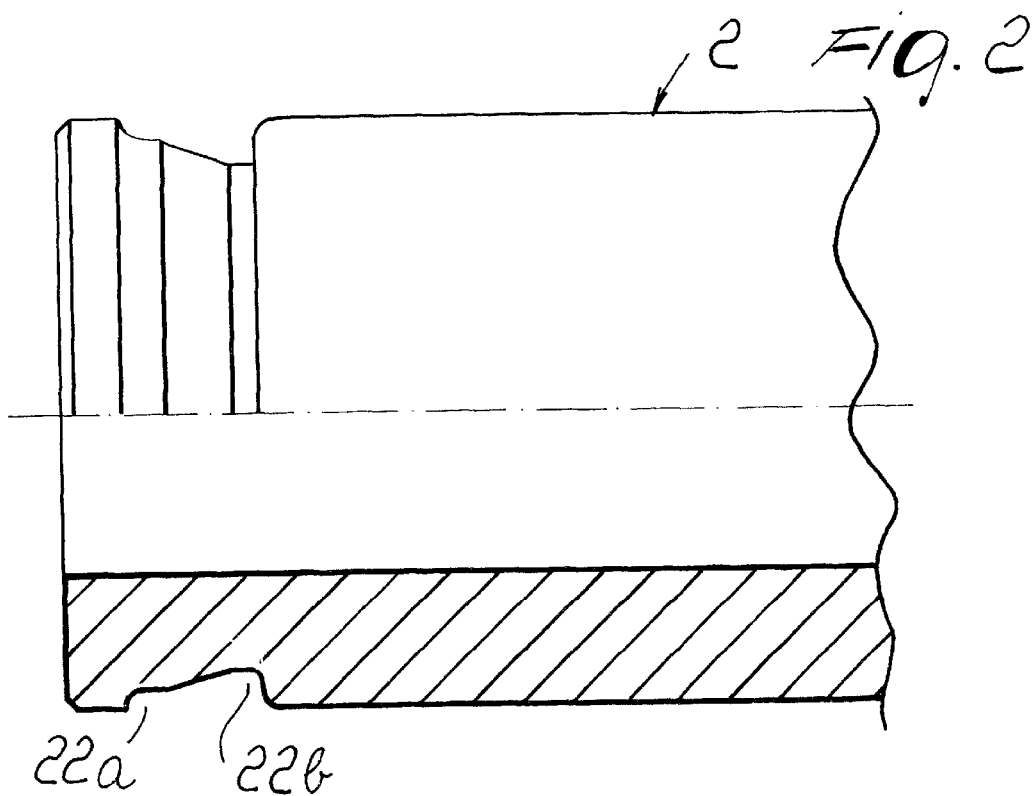
FIG. 2 is a view of a detail of the insert of FIG. 1.

With reference to the figures, the insert, according to the invention, generally designated by the reference numeral 1, comprises an insert body 2 which is meant to be inserted, by means of a portion 3, within a flexible hose to be connected, which is not shown in the figures.

The portion 3 meant to be inserted in the flexible hose is conveniently provided with an outer surface which forms steps 4 so as to allow the portion 3 of the insert body 2, hereinafter called insert, to grip the internal surface of the flexible hose that is meant to be connected.

The insert according to the invention furthermore comprises a rotatable male element 5 which is suitable to be fitted on the end of the insert 2 that lies opposite the end portion 3 that is suitable to be inserted in the flexible hose to be connected.

The rotatable male element 5 is conveniently provided with an external thread 6 which allows to screw the male element 5 into a threaded port of an apparatus to which the insert, and therefore the flexible hose, are to be connected.

As shown in detail in the figure, the profile of the outer surface of the insert body 2 is provided so as to form portions which have a larger diameter than others (in practice, the insert has two diameters), forming a pair of grooves 20 and 21. In particular, a first collar 7 allows the abutment of the flexible hose fitted over the portion 3 of the insert, and a second pair of appropriately mutually spaced collars 8 and 9 delimits the first groove 20 for accommodating at least one sealing element, which is conveniently provided for example by an O-ring.

The rotatable male element 5, fitted over the insert body 2, is conveniently locked thereat by a retention element 11, constituted for example by an elastic ring, which is made of a material which is suitable to undergo deformation as a consequence of the fitting of the rotatable male element over the end of the body of the insert, the internal profile of the rotatable male element being appropriately flared in order to facilitate the sliding of the ring 11 during assembly.

The ring 11 is accommodated in an additional groove formed at the end of the insert 2 that lies opposite the end portion 3. Said groove is conveniently provided so as to form two seats 22a and 22b which are mutually connected by a continuous curved profile, so that the ring 11 can slide, during assembly, from one seat to the other.

Retention of the male element in the opposite direction is provided by the collar 9 and by the internal shoulder on the rotatable male element 5 formed by the double diameter of its hole.

As mentioned, the pair of collars 8 and 9 is such as to form a space for a seat of a sealing element 10, and the first collar 8 of the pair of collars 8 and 9 is conveniently provided, at its outer surface, with a plurality of circumferential lines 12 which allow to visually identify the extent to which the insert body 2 is inserted in the rotatable male element 5 meant to be screwed onto the port of an apparatus (not shown).

Vibration damping means are conveniently inserted in a cavity 21 which is formed between the rotatable male element 5 and the second collar 9 of the pair of collars 8 and 9. The vibration damping means are conveniently constituted by a spring 13.

The annular sealing element 14 is conveniently arranged around the outer surface of the rotatable male element 5, above the thread 6 of the rotatable male element 5.

The sealing element 14 conveniently abuts against a protruding portion 17 of the rotatable male element, which is nut-shaped.

The vibration damping means 13 are conveniently constituted by the annular spring, which is accommodated in one 21 of the two grooves formed by the second pair of collars 8 and 9, and is kept in position by the internal abutment surface of the rotatable male element 5 inside which the body 2 of the insert is inserted.

With reference to the above cited figure, the operation of the insert with connecting outlet according to the invention is as follows.

Initially, the rotatable male element 5 is screwed by means of its thread 6 to an internally threaded port of a machine or apparatus. Once the rotatable male element 5 has been screwed on, "off-line", the insert body 2 is inserted, with its portion 3, within the flexible hose to be connected, and the hose abuts with its end against the first collar 7.

The connection is completed in a known manner by tightening a bush (not shown).

At this point, the "on-line" operator can directly insert the insert end that lies opposite the portion 3 into the rotatable male element 5, so that the insert enters until the circumferential lines 12 are no longer externally visible, and the retention element 11 undergoes a deformation, contracting (sliding from the seat 22a to the seat 22b) and then regaining its original shape (and returning to the seat 22a) when the insert reaches its final position, thus preventing the possibility of disassembly, which can occur only by removing the rotatable male element 5 from the system and by subsequently mechanically opening the retention element 11.

The hydraulic seal between the insert body 2 and the rotatable male element 5 is provided by means of the sealing element 10, while the sealing element 14 allows to provide a seal of the rotatable male element 5 on the port of the machine to which the rotatable male element 5 is screwed.

An extrusion-preventing ring 18 is conveniently arranged adjacent to the sealing element 10 within the groove formed between the pair of collars 8 and 9 of the outer surface of the insert body 2.

The collar 9 also acts as an abutment element for the insert body 2 against the flared internal surface profile of the rotatable male element 5 when the insert body 2 is inserted in the rotatable male element 5.

Disassembly of the insert with connecting outlet according to the invention occurs by first disassembling the rotatable male element 5, unscrewing it from the threaded port into which it is screwed, and then extracting the insert body 2 from the rotatable male element 5.

In practice it has been found that the insert according to the invention fully achieves the intended aim and objects, since it allows to provide a quick-coupling connection with two-step disassembly.

The insert thus conceived is cheaper than the third type of known insert described earlier, which is the only one that has the quick-assembly feature.

The insert thus conceived is susceptible of numerous modifications and variations, all of which are within the scope of the appended claims; all the details may furthermore be replaced with other technically equivalent elements.

In practice, the materials used, so long as they are compatible with the specific use, as well as the dimensions, may be any according to the requirements and the state of the art. The disclosures in Italian Patent Application No. MI2000A000296 from which this application claims priority are incorporated herein by reference.

What is claimed is:

1. An insert with connecting outlet for flexible hoses, for hydraulic and industrial applications, comprising: a body having a first end for insertion in a flexible hose to be connected and a second end for insertion in a port of an apparatus; a rotatable male element, mountable at said second end of the body for locking engagement thereof at the port of the apparatus, said rotatable male element being externally threaded for engagement with said port; and a retention means fixable at the second end of the body to retain and lock said rotatable male element over said second end of the body, said retention means comprising at least one elastic retention ring.

2. The insert of claim 1, wherein said at least one elastic retention ring is made of a material which undergoes deformation during insertion of said second end of the body of the insert in said rotatable male element and returns to original shape once insertion has occurred.

3. The insert of claim 2, further comprising an additional groove formed at the second end of said insert, said additional groove forming two contiguous seats which are connected to each other by a curved surface, to allow accommodation of said retention means and sliding thereof from one seat to the other, during assembly of said insert.

4. The insert of claim 1, further comprising a plurality of collars located at an outer surface of said body.

5. The insert of claim 4, wherein a first one of said collars constitutes an abutment collar element for said flexible hose in which said first end of the body of the insert is inserted.

6. The insert of claim 4, further comprising a pair of grooves formed by a pair of collars of said plurality of collars, said grooves being closed externally by said rotatable male element upon mounting thereof onto said second end.

7. The insert of claim 6, further comprising a sealing element and an extrusion-preventing element, said pair of collars being constituted by a first collar and a second collar, delimiting therebetween a first one of said grooves, which accommodates said sealing and extrusion preventing elements.

8. The insert of claim 7, comprising an additional sealing element, said second collar of said pair of collars delimiting, together with an internal profile region of said rotatable male element, a second one of said grooves for accommodation of said additional sealing element, said second collar further constituting an abutment element for insertion of said insert in said rotatable male element.

9. The insert of claim 8, wherein said internal profile region of said rotatable male element is shaped so as to form at least one step which delimits, upon mounting said male element on said second end of the body together with said second collar of the pair of collars, said second groove.

10. The insert of claim 9, wherein said first collar of the pair of collars is externally provided with a plurality of circumferential lines constituting a visual indication of an insertion extent of said body of the insert in said rotatable male element.

11. The insert of claim 1, wherein said first end of the body of the insert is provided with a stepped profile for engagement of said first end in said flexible hose.

12. The insert of claim 11, wherein said rotatable male element is rovided with a larger-diameter nut-shaped portion.

* * * * *